United States Patent
Agehama et al.

(10) Patent No.: US 11,720,041 B2
(45) Date of Patent: Aug. 8, 2023

(54) PRINT CONTROL APPARATUS AND NON-TRANSITORY COMPUTER READABLE MEDIUM

(71) Applicant: FUJIFILM BUSINESS INNOVATION CORP., Tokyo (JP)

(72) Inventors: Ryo Agehama, Kanagawa (JP); Koji Takahata, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 287 days.

(21) Appl. No.: 16/895,176

(22) Filed: Jun. 8, 2020

(65) Prior Publication Data
US 2021/0124297 A1   Apr. 29, 2021

(30) Foreign Application Priority Data

Oct. 24, 2019  (JP) ................. 2019-193777

(51) Int. Cl.
*G06F 3/12* (2006.01)
*B41J 29/38* (2006.01)
*G03G 15/00* (2006.01)

(52) U.S. Cl.
CPC ............. *G03G 15/50* (2013.01); *B41J 29/38* (2013.01); *G03G 15/6552* (2013.01); *G06F 3/1296* (2013.01); *G03G 15/5029* (2013.01); *G06F 3/121* (2013.01); *G06F 3/126* (2013.01); *G06F 3/1229* (2013.01); *G06F 3/1282* (2013.01)

(58) Field of Classification Search
CPC ............. G03G 15/50; G03G 15/6552; G03G 15/5029; G06F 3/1296; G06F 3/126; G06F 3/1282; G06F 3/1229; G06F 3/121; B41J 29/38
See application file for complete search history.

(56) References Cited

U.S. PATENT DOCUMENTS

| | | | | |
|---|---|---|---|---|
| 5,913,093 A * | 6/1999 | Yamanaka | ......... | G03G 15/6538 399/397 |
| 2010/0156024 A1* | 6/2010 | Tanaka | ............... | G03G 15/6552 271/3.14 |

FOREIGN PATENT DOCUMENTS

| | | | |
|---|---|---|---|
| JP | H10-104900 A | 4/1998 | |
| JP | H10-175769 A | 6/1998 | |
| JP | 2002215343 A * | 8/2002 | .............. B41J 29/38 |

(Continued)

OTHER PUBLICATIONS

May 23, 2023 Office Action issued in Japanese Patent Application No. 2019-193777.

*Primary Examiner* — Yaovi M Ameh
(74) *Attorney, Agent, or Firm* — Oliff PLC (57) ABSTRACT

A print control apparatus includes a processor configured to receive printing information including the number of prints to be printed in accordance with one of print jobs, acquire the numbers of containable sheets left for multiple respective container units that contain printing media printed in accordance with the print jobs, and perform control if a maximum value of the acquired numbers of containable sheets left for the respective container units is higher than or equal to the number of prints in one of the print jobs that is to be executed subsequently. The control is performed to discharge one of the printing media that is printed in accordance with the print job to a container unit of the multiple container units that has the maximum value of the numbers of containable sheets left.

19 Claims, 6 Drawing Sheets

(56) References Cited

FOREIGN PATENT DOCUMENTS

| JP | 2003-162404 | A |   | 6/2003 | |
|----|-------------|---|---|--------|---|
| JP | 2009-042347 | A |   | 2/2009 | |
| JP | 2011-128199 | A |   | 6/2011 | |
| JP | 2017170843  | A | * | 9/2017 | ............ B41J 29/38 |

* cited by examiner

| JOB HISTORY | | | | | |
|---|---|---|---|---|---|
| RECORDING DATE AND TIME | ID | JOB NAME | DISCHARGE DESTINATION | RECEIVING START DATE AND TIME | PRINTING START DATE AND TIME |
| · · · · · · | · · | · · · · · | STACKER TRAY 1 | · · · · · · · · | · · · · · · · · |
| · · · · · · | · · | · · · · · | STACKER TRAY 2 | · · · · · · · · | · · · · · · · · |
| · · · · · · | · · | · · · · · | STACKER TRAY 1 | · · · · · · · · | · · · · · · · · |
| · · · · · · | · · | · · · · · | STACKER TRAY 2 | · · · · · · · · | · · · · · · · · |
| · · · · · · | · · | · · · · · | STACKER TRAY 1 | · · · · · · · · | · · · · · · · · |
| · · · · · · | · · | · · · · · | STACKER TRAY 1 | · · · · · · · · | · · · · · · · · |
| · · · · · · | · · | · · · · · | STACKER TRAY 2 | · · · · · · · · | · · · · · · · · |

THE NUMBER OF CURRENT CONTAINABLE SHEETS LEFT FOR STACKER TRAY 1: 5000
THE NUMBER OF CURRENT CONTAINABLE SHEETS LEFT FOR STACKER TRAY 2: 7000 (MAXIMUM VALUE)

PRINT CONTROL APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-193777 filed Oct. 24, 2019.

BACKGROUND

(i) Technical Field

The present disclosure relates to a print control apparatus and a non-transitory computer readable medium.

(ii) Related Art

Japanese Unexamined Patent Application Publication No. 10-175769 discloses a sheet outputting apparatus for an image forming apparatus. The sheet outputting apparatus includes multiple bins that contain sheets, a detection unit, a discharge unit, an image forming unit, and a controller. The detection unit detects the amount of containable sheets for each of the multiple bins. The discharge unit discharges the sheets to the multiple bins. The image forming unit generates image data and forms images on the sheets. The controller controls the discharge unit to decide at least one of the bins as a discharge destination to minimize the number of bins as discharge destinations for the sheets each having an image formed thereon in accordance with a job, thus select the bin from the multiple bins, and discharge the sheets to the bin.

Japanese Unexamined Patent Application Publication No. 2011-128199 discloses an image forming apparatus including an image forming unit, multiple discharge units, a detection unit, a display, and a controller. The image forming unit forms images on sheets fed from a paper feed unit in accordance with a print job. In the discharge units, the sheets having the images formed thereon are loaded. The detection unit detects the amount of the sheets loaded in each discharge unit. The controller selects a discharge unit to be used in the print job. The controller also displays time when the used discharge unit is changed and time when there is no discharge unit to which a sheet is dischargeable, by using the vertical axis and the horizontal axis respectively representing the number of prints for the print job and a run time, or vice versa.

SUMMARY

There is a configuration having multiple container units that contain printed printing media. In the configuration, when a container unit (high capacity stackers (HCS) that is a discharge destination for the printed printing media is full, the discharge destination for the printing media is switched to a different container unit. The configuration causes the discharge destination for the printing media in one print job to be divided into the multiple container units.

Aspects of non-limiting embodiments of the present disclosure relate to avoiding division of a discharge destination for printing media in one print job into multiple container units.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a print control apparatus including a processor configured to receive printing information including a number of prints to be printed in accordance with one of print jobs, acquire numbers of containable sheets left for multiple respective container units that contain printing media printed in accordance with the print jobs, and perform control if a maximum value of the acquired numbers of containable sheets left for the respective container units is higher than or equal to the number of prints in one of the print jobs that is to be executed subsequently. The control is performed to discharge one of the printing media that is printed in accordance with the print job to a container unit of the multiple container units that has the maximum value of the numbers of containable sheets left.

BRIEF DESCRIPTION OF THE DRAWINGS

Exemplary embodiments of the present disclosure will be described in detail based on the following figures, wherein:

FIGS. 6A and 6B are explanatory views illustrating container units of a print control apparatus in the related art.

DETAILED DESCRIPTION

First Exemplary Embodiment

A first exemplary embodiment will be described with reference to the drawings. Note that components and processes having the same functions throughout the drawings are denoted by the same reference numerals, and repeated description is omitted.

First, a print processing apparatus 10 in which a printer 15 including a print control apparatus 50 according to this exemplary embodiment is installed will be described.

Figure 1:
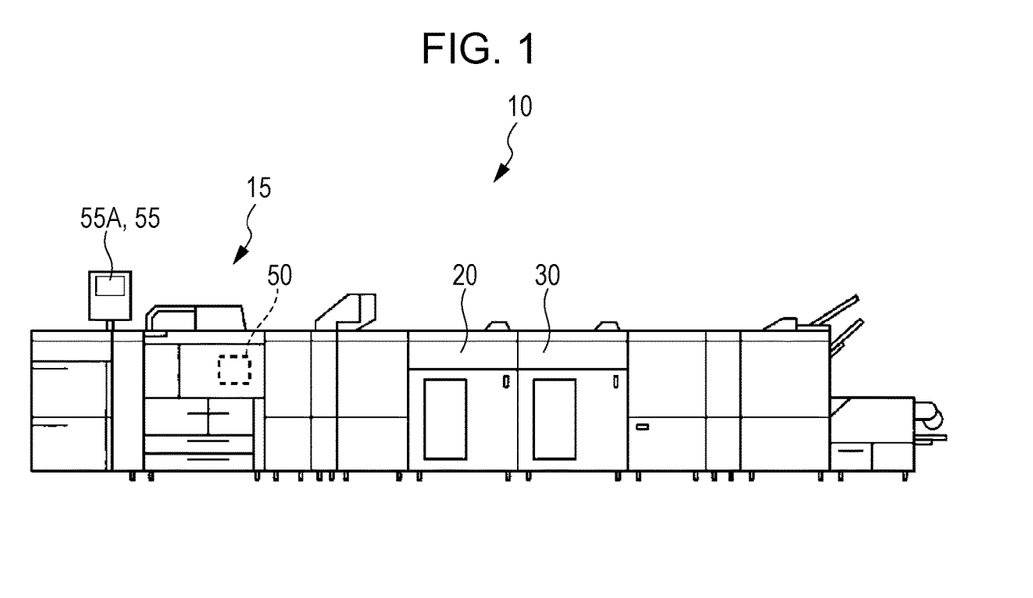
FIG. 1 is a schematic front view illustrating a print processing apparatus in which a printer including a print control apparatus according to a first exemplary embodiment is installed.

FIG. 1 is a schematic front view of the print processing apparatus 10 according to this exemplary embodiment.

Examples of the printer 15 according to this exemplary embodiment include a production printer. The production printer performs mimeography for an in-house printing department of a company, a print shop, and the like and is generally able to perform large volume printing. Note that this exemplary embodiment is not limited to the production printer and is applicable to a general printer (such as a business printer or a home printer).

The print processing apparatus 10 includes multiple (specifically, two) container units 20 and 30 as high capacity stackers (HCSs) for containing sheets of paper printed by the printer 15.

The container units 20 and 30 as the high capacity stackers are designed to be able to contain up to 10000 sheets P. The container units 20 and 30 are designed such that the contained sheets P are directly loaded in the dollies (not illustrated) inside the respective container units 20 and 30. This enables even a large number of sheets P to be carried easily, and it is convenient, for example, in a case where the sheets P are carried for a subsequent process.

The printer 15 is an example of a printer that prints an image on the sheet P. Specifically, the printer 15 prints an image on the sheet P in accordance with an acquired print job. The term "print job" denotes a unit of processing in a printing operation instructed in one printing instruction.

The printer 15 is also an example of an image forming apparatus that forms an image on the sheet P. The printed sheet P is an example of a printed material. The sheet P is also an example of a printing medium.

More specifically, the printer 15 includes container units (not illustrated) that contain sheets P yet to be printed, a printing unit (not illustrated), and the print control apparatus 50.

The container units for the sheets P yet to be printed of the printer 15 have a function of containing sheets P to be supplied to the printing unit of the printer 15 but are not particularly illustrated. Specifically, the container units for the sheets P yet to be printed are each composed of, for example, a container tray in which the sheets P are stacked and that contain the sheets P. More specifically, for example, the container units contain the sheets P of different sizes from each other.

The printer 15 has a function of transporting each sheet P contained in the corresponding container unit of the printer 15 to the printing unit of the printer 15.

The print processing apparatus 10 also includes transportation function units (not illustrated) between the printer 15 and the container units 20 and 30 as the high capacity stackers (HCSs) that contain the printed sheets P. Each transportation function unit transports the printed sheets P to a corresponding one of the container units 20 and 30.

Specifically, these transportation function units are implemented by, for example, feed rollers that feed each sheet P from the corresponding container unit of the printer 15, transportation paths from the container units of the printer 15 to the printing unit, transportation rollers (not illustrated) arranged along the transportation paths from the printing unit of the printer 15 to the container units 20 and 30 for containing the printed sheets P, and the like but are not particularly illustrated.

In this exemplary embodiment, the print processing apparatus 10 includes a switching mechanism (not illustrated) on the way along the transportation paths. The switching mechanism performs switching of the discharge destination, that is, switching in discharging a printed sheet P to the container unit 20 or the container unit 30, but the switching mechanism is not particularly illustrated.

Specifically, the switching mechanism includes a switching member (not illustrated). The switching member is movable to a first position and a second position. At the first position, the switching member opens a path from the printing unit of the printer 15 to the container unit 20 and closes a path from the printing unit to the container unit 30. At the second position, the switching member closes the path from the printing unit to the container unit 20 and opens the path from the printing unit to the container unit 30. The switching member is not particularly illustrated.

On the transportation paths, the sheet P printed by the printing unit (not illustrated) of the printer 15 is transported with the multiple transportation rollers in a state where the switching member is located at the first position (not illustrated), and thereby the sheet P is discharged to the container unit 20.

A sheet P printed by the printing unit of the printer 15 is transported with the multiple transportation rollers in a state where the switching member is located at the second position (not illustrated), and thereby the sheet P is discharged to the container unit 30.

The printing unit of the printer 15 has a function of printing an image on the sheet P. Specifically, the printing unit prints the image on the sheet P by electrophotography. More specifically, charging, exposure, development, transfer, and fixing processes are performed, and thereby the printing unit prints the image on the sheet P, that is, forms the image. The printing unit is also an image forming unit that forms an image on the sheet P. Note that the printing unit is capable of duplex printing, that is, printing on two sides of the sheet P.

The container unit 20 and the container unit 30 are so-called high capacity stackers (HCSs) to which printed sheets P are discharged. As illustrated in FIG. 1, the container unit 20 and the container unit 30 are disposed adjacent to each other side by side in the right and left directions. Specifically, the container unit 20 is disposed upstream (closer to the printer 15) of the container unit 30.

The container unit 20 and the container unit 30 each have a capped number of dischargeable sheets P. The number of full sheets of each of the container unit 20 and the container unit 30 is, for example, 10000. That is, the container unit 20 and the container unit 30 have the same number of full sheets.

The numbers of full sheets denote the numbers of sheets causing the container unit 20 and the container unit 30 to be full when the sheets P are discharged to the container unit 20 and the container unit 30. It may be said that the numbers of full sheets are also the capped numbers of sheets allowing the sheets P to be discharged to the container unit 20 and the container unit 30, the maximum numbers of sheets P containable in the container unit 20 and the container unit 30, or the numbers of containable sheets left when the numbers of contained sheets are 0.

Note that the number of full sheets is not limited to 10000. The container unit 20 and the container unit 30 may have different numbers of full sheets.

In this exemplary embodiment, if a discharge destination is designated in a print job, a sheet P is discharged to a designated one of the container unit 20 and the container unit 30. If the discharge destination is not designated in a print job, a sheet P is first discharged to a discharge destination set in advance (one of the container unit 20 and the container unit 30), the switching member moves in accordance with switching control (described later), and the discharge destination of a sheet P is switched to the other one of the container unit 20 and the container unit 30.

In this exemplary embodiment, only two container units that are the container unit 20 and the container unit 30 are provided; however, the container units are not limited to these two container units. Three or more container units may be provided.

Figure 2:
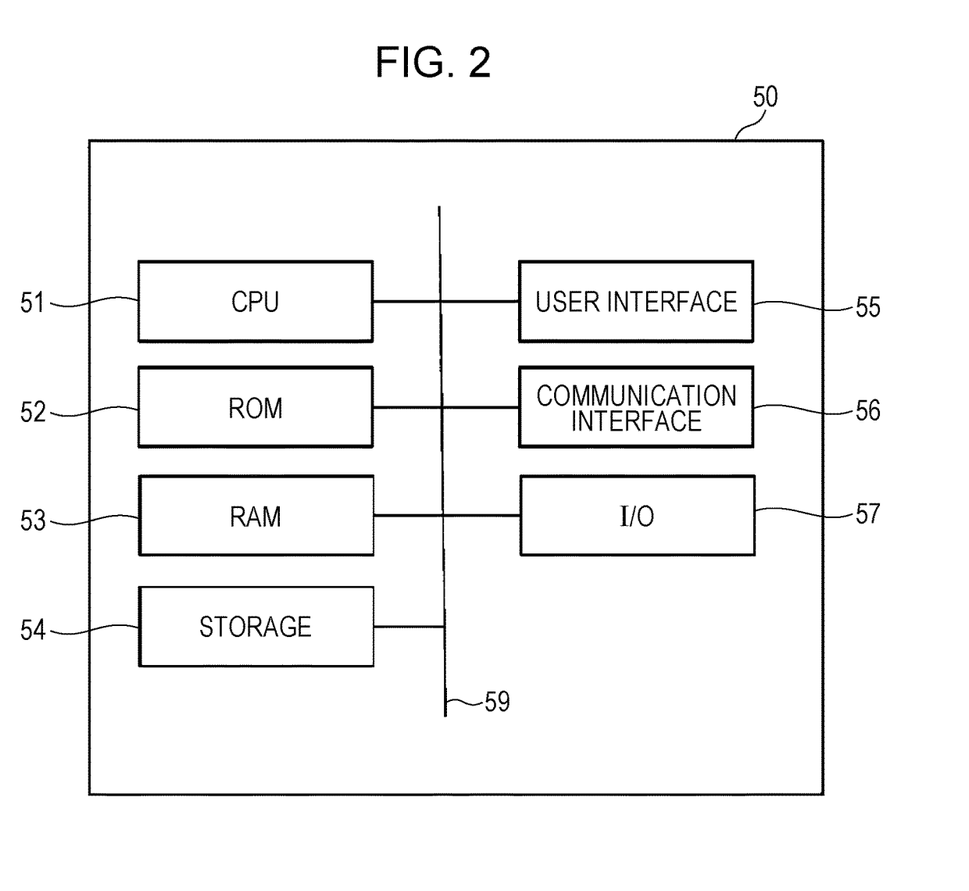
FIG. 2 is a block diagram illustrating the hardware configuration of the print control apparatus according to the first exemplary embodiment.

The print control apparatus 50 is an apparatus that controls operations of components of the printer 15. FIG. 2 is a block diagram illustrating the hardware configuration of the print control apparatus 50.

As illustrated in FIG. 2, the print control apparatus 50 has a function as a computer and includes a central processing unit (CPU) 51, a read only memory (ROM) 52, a random access memory (RAM) 53, a storage 54, a user interface 55, a communication interface 56, and an input/output unit (I/O) 57. The components of the print control apparatus 50 are connected via a bus 59 to be able to communicate with each other.

The CPU 51 runs various programs and controls the components. That is, the CPU 51 reads out a program from the ROM 52 or the storage 54 and runs the program by using the RAM 53 as a work area. The CPU 51 controls the components of the printer 15 and executes various arithmetic processes in accordance with the program stored in the ROM 52 or the storage 54.

The ROM 52 stores the various programs and various pieces of data. The RAM 53 temporarily stores a program or data, serving as the work area. The storage 54 is composed of a memory device such as a hard disk drive (HDD) or a solid state drive (SSD) and stores the various programs including the operating system and the various pieces of data.

The user interface 55 is an interface for a user to use the printer 15. The user interface 55 has, for example, an input unit such as buttons or a touch panel and a display such as a liquid crystal display. The user gives an instruction for a print job.

A display 55A (described later) has a touch panel. The display 55A is designed to allow the user to select non-printing control not to perform printing or capped printing control by touching a touch panel button displayed on the display 55A with a finger. In the non-printing control, if the number of prints in a print job to be executed subsequently exceeds the maximum value of the numbers of containable sheets left, that is, the maximum number of containable sheets left among the numbers of containable sheets left for the container units 20 and 30, printing is not performed. In the capped printing control, printed printing media the number of which is up to the maximum value are discharged to a container unit able to contain the printing media (described later).

The communication interface 56 is an interface for communicating with a user terminal such as a personal computer. A wired or wireless communication mode is used as the communication mode for the communication interface 56. Such a standard as Ethernet (registered trademark), Fiber distributed data interface (FDDI), or Wi-Fi (registered trademark) is used as the communication standard for the communication interface 56. The I/O 57 connects the CPU 51 to the components of the printer 15.

Figure 3:
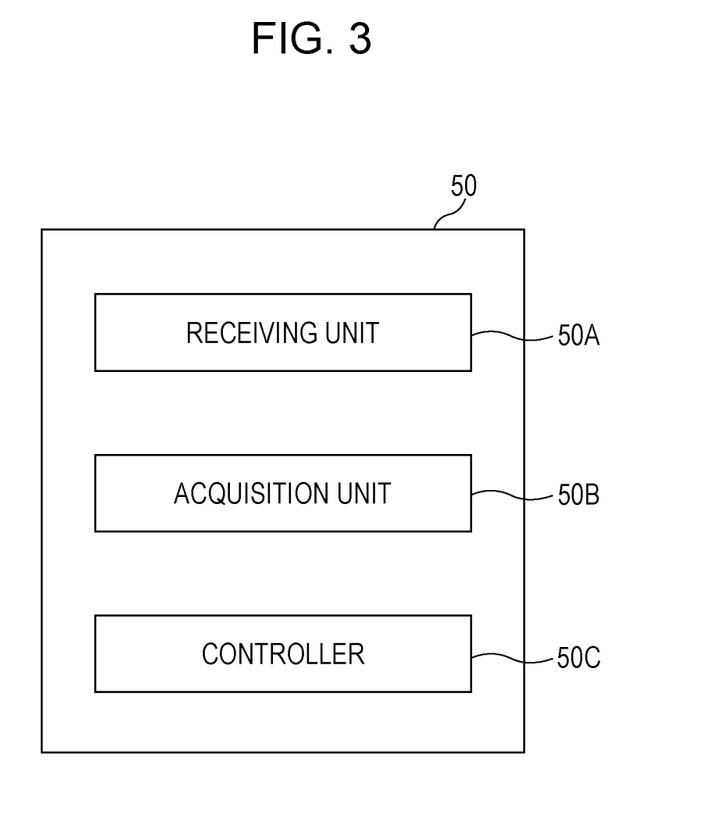
FIG. 3 is a block diagram illustrating an example functional configuration of the print control apparatus according to the first exemplary embodiment.

When the above-described program is run, the print control apparatus 50 implements various functions by using the hardware resources described above. A functional configuration implemented by the print control apparatus 50 will be described. FIG. 3 is a block diagram illustrating an example functional configuration of the print control apparatus 50.

As illustrated in FIG. 3, the print control apparatus 50 includes a receiving unit 50A, an acquisition unit 50B, and a controller 50C as components in the functional configuration. Each component in the functional configuration is implemented in such a manner that the CPU 51 reads out a printing program and table information stored in the ROM 52 or the storage 54 and runs the printing program.

The receiving unit 50A is used to receive printing information including the number of prints in a print job.

The receiving unit 50A receives the print job. In the print job, the number of print sets, the number of pages per printed material set, whether to perform duplex printing, a container unit to which a sheet P is fed, a discharge destination to which the sheet P is discharged, and the like are designated.

The receiving unit 50A also receives, as printing information regarding a print job, information regarding the number of print sets in the print job, the number of pages per printed material set, whether to perform duplex printing, a container unit, a discharge destination, and the like.

For the single-sided printing, the number of prints is obtained by the number of pages per printed material set×the number of print sets. For the duplex printing, the number of prints is obtained by the number of pages per printed material set×the number of print sets÷2. The information regarding the number of print sets, the number of pages per printed material set, and whether to perform duplex printing is an example of information indicating the number of prints.

The print job is input, for example, in accordance with a printing instruction transmitted via a user terminal able to perform communications via the communication interface 56, and the receiving unit 50A receives the print job. Alternatively, the receiving unit 50A may receive a print job generated in such a manner that a reading device (specifically, a scanner) reads a document.

The acquisition unit 50B acquires the number of containable sheets left for the multiple container units (HCS) 20 and 30 that contain the printing media each printed in accordance with the corresponding print job.

Specifically, the acquisition unit 50B counts the number of sheets P discharged to the container unit 20 or the container unit 30. The acquisition unit 50B uses, for example, a detection unit such as an optical sensor installed on the transportation path for the sheets P to count the number of sheets P passing the detection unit and thereby to count the number of sheets P discharged to the container unit 20 or the container unit 30.

The acquisition unit 50B detects the number of sheets P staying in each of the container unit 20 and the container unit 30. Specifically, the acquisition unit 50B performs the detection in the following manner.

First, the acquisition unit 50B detects whether at least one sheet P is present in the container unit 20 or the container unit 30. Specifically, the acquisition unit 50B detects whether the sheet P is present in the container unit 20 or the container unit 30, for example, by using a detection unit such as an optical sensor installed on each of the container unit 20 and the container unit 30.

If no sheet P is present in each of the container unit 20 and the container unit 30, the acquisition unit 50B acquires "0" as the number of staying sheet P for each of the container unit 20 and the container unit 30. If at least one sheet P is present in the container unit 20, the container unit 30, or both, the acquisition unit 50B acquires the number of counted sheets as the number of staying sheets P for the container unit 20, the container unit 30, or both. The acquisition unit 50B then acquires the number of containable sheets left for each of the container unit 20 and the container unit 30 by subtracting the above-described number of staying sheets from the maximum number of sheets P containable in the corresponding one of the container unit 20 and the container unit 30 (that is, the number of full sheets).

Figure 5:
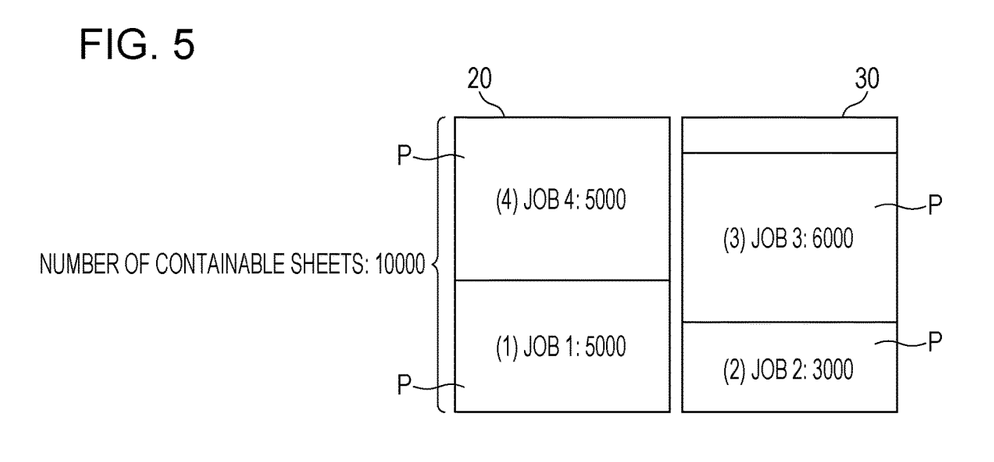
FIG. 5 is an explanatory view illustrating container units used in the printing process executed by the print control apparatus according to the first exemplary embodiment.

For example, when the maximum number of containable sheets (the number of full sheets) is 10000, and when the number of counted staying sheets is 3000, the number of containable sheets left is 10000−3000=7000 (see FIG. 5).

If the maximum value of the acquired numbers of containable sheets left for the respective container units 20 and 30 is higher than or equal to the number of prints in a print job to be executed subsequently, the controller 50C performs control to discharge a printed printing medium in the print job to one of the container unit 20 and the container unit 30 that has the maximum value of the numbers of containable sheets left for the multiple container units 20 and 30. For example, in the above-described example, as illustrated in FIG. 5, when the numbers of full sheets of the container unit 20 and the container unit 30 are each 10000, the container unit 20 and the container unit 30 respectively contain 5000 sheets for a job 1 and 3000 sheets for a job 2. In this case, the number of containable sheets left for the container unit 20 is 5000, and the number of containable sheets left for the container unit 30 is 7000. The maximum value of the numbers of containable sheets left is 7000 for the container unit 30. At this time, the number of sheets to be printed in a job 3 that is a print job to be executed subsequently is 6000 and is within a range up to the maximum value "7000" of the numbers of containable sheets left, and thus the controller 50C performs control to discharge 6000 printing media in the job 3 that is the relevant print job to the container unit 30 of the multiple container units 20 and 30 that has the maximum value (7000) as the number of containable sheets left (see FIG. 5).

As described above, if the number of prints in the print job to be executed subsequently (6000 in the above-described example) is less than or equal to the maximum value of the numbers of containable sheets left (7000 in the above-described example), the controller 50C further performs control to report one of the multiple container units 20 and 30 (for example, the container unit 30) that has the maximum value (for example, 7000) of the numbers of containable sheets left by using display on the display 55A serving as the user interface 55 (see FIG. 7). That is, in the above-described example, a notification that the sheets P are to be contained in the container unit 30 is displayed on the display 55A, and thereby the containing in the container unit 30 is reported to the user. It goes without saying that the mode of the reporting is not limited to the displaying on the display 55A. The reporting may be performed in such a manner that in addition to the display on the display 55A or instead of the display, a lamp or the like (a rotating light, that is, a so-called patrol-car beacon light) that is provided at a predetermined position such as an upper part of each of the container units 20 and 30 is turned on (or rotated with the rotating light turned on). Alternatively, the containing in the container unit 30 may be reported by voice from a speaker.

Figure 7:
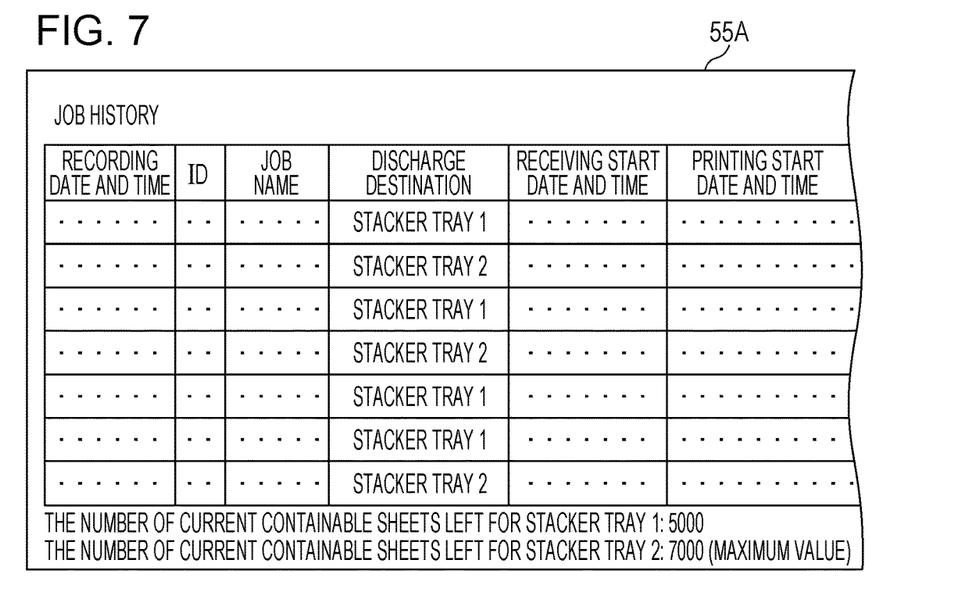
FIG. 7 is an explanatory view illustrating an example job history presented on the display of the print control apparatus according to the first exemplary embodiment.

Further, as illustrated in FIG. 7, the controller 50C may report the number of containable sheets left for one of the multiple container units 20 and 30 that has the maximum value of the numbers of containable sheets left by using the display on the display 55A.

Specifically, in the above-described example, as illustrated in FIG. 7, the report includes, for example, directly displaying a numerical value of 7000 on the display 55A as an indicator indicating that the maximum value of the numbers of containable sheets left is 7000 for the container unit 30 (for example, the stacker tray 2).

Alternatively, in addition to the display on the display 55A or instead of this, the reporting may be performed by the speech "The number of containable sheets left is 7000." from the speaker.

Further, in this exemplary embodiment, if the number of prints in the print job to be executed subsequently exceeds the maximum value of the numbers of containable sheets left, the controller 50C performs non-printing control not to perform the printing in the print job (see step S116 in FIG. 4).

Specifically, in the above-described example, as illustrated in FIG. 5, for example, if the number of prints in the job 3 that is a print job to be executed subsequently is 8000, not 6000, and exceeds 7000 as the maximum value of the numbers of containable sheets left, the controller 50C performs the non-printing control not to perform the printing in the job 3 as the print job to be executed subsequently.

In this exemplary embodiment, if the controller 50C performs the non-printing control not to perform the printing as described above, the controller 50C further performs control to present a notification that the above-described control (non-printing control) has been performed.

In this case, the controller 50C presents, on the display 55A serving as the user interface 55, the notification that the non-printing control has been performed.

Actions of Print Control Apparatus 50

The actions of the print control apparatus 50 will be described. FIG. 4 is a flowchart illustrating the flow of a printing process by the print control apparatus 50.

The printing process is executed in such a manner that the CPU 51 reads out the printing program from the ROM 52 or the storage 54 and runs the printing program.

If the CPU 51 acquires a print job with a discharge destination not designated, the CPU 51 acquires information regarding the numbers of containable sheets left for the container units 20 and 30 as all the high capacity stackers (HCSs) (step S110).

The CPU 51 acquires the maximum value of the acquired numbers of containable sheets left for the container units 20 and 30 as all the high capacity stackers (HCSs) (step S111).

Specifically, in the information regarding the numbers of containable sheets left for the container units 20 and 30 acquired in step S110, the numerical value of the maximum value of the numbers of containable sheets left and the container unit having the maximum value (one of the container unit 20 and the container unit 30) are acquired.

The CPU 51 determines whether the number of sheets in a print job to be executed subsequently is less than or equal to the maximum value of the numbers of containable sheets left acquired in step S111, in other words, whether the maximum value exceeds the number of sheets in the print job to be executed subsequently (step S112).

If the CPU 51 determines in step S112 that the number of sheets in the print job to be executed subsequently is less than or equal to the maximum value of the numbers of containable sheets left acquired in step S111 (step S112: YES), the CPU 51 performs control to discharge printed sheets P to the container unit having the maximum number of containable sheets left (the container unit 20 or the container unit 30) (step S113).

The CPU 51 completes the print job when the discharging of all of the printed sheets P ends (step S114).

The CPU 51 causes the discharge destination (one of the container unit 20 and the container unit 30) for the sheets P to be displayed in a print job history displayed on the display 55A (step S115). The printing process is then terminated.

In contrast, if the CPU 51 determines in step S112 that the number of sheets in the print job to be executed subsequently is more than the maximum value of the numbers of containable sheets left acquired in step S111, that is, the number of sheets in the print job to be executed subsequently exceeds the maximum value of the numbers of containable sheets left acquired in step S111, the CPU 51 causes the display 55A to display an error and performs the non-printing control not to perform the printing in the print job to thereby restrain the sheets P from being printed and output (step S116). The printing process is then terminated.

The number of sheets in the print job to be executed subsequently, that is, the number of prints to be printed is calculated from information regarding the number of print sets, the number of pages per printed material set, and whether to perform duplex printing acquired by the acquisition unit 50B.

Specifically, for the single-sided printing, the number of prints to be printed is obtained by the number of pages per printed material set×the number of print sets. For the duplex printing, the number of prints to be printed is obtained by the number of pages per printed material set×the number of print sets÷2.

For example, in a case where the number of pages per printed material set is 200 and where the number of print sets is 3, the number of prints for the single-sided printing is 200×3=600.

The printing process is executed in the above-described steps in this exemplary embodiment. An example of the printing process in such a print job as specifically described below will be described by using FIG. 5.

Suppose a case where print processing apparatus 10 includes the container unit 20 and the container unit 30 each of which may contain 10000 sheets.

Specifically, the number of prints in print jobs are specifically 5000 for the job 1, 3000 for the job 2, 6000 for the job 3, 5000 for a job 4, and 3000 for a job 5.

A printing process based on the content of the print jobs as described above is executed by the print control apparatus 50 according to this exemplary embodiment.

(1) When the job 1 is executed, the container unit 20 and the container unit 30 are each in the initial state with the number of contained sheets "0". The CPU 51 thus designates the container unit 20 in accordance with the initial discharge destination value as a discharge destination set in advance for such a case. 5000 sheets P in the job 1 are thereby contained in the container unit 20.

(2) When the job 2 is executed, the number of containable sheets left for the container unit 20 is 5000, and the number of containable sheets left for the container unit 30 is 10000. The maximum value of the numbers of containable sheets left is thus 10000 for the container unit 30. The number of prints in the job 2 is 3000 and is within a range up to the maximum value "10000" of the numbers of containable sheets left, and the CPU 51 designates the container unit 30 having the number of containable sheets left "10000" that is the maximum value, as a discharge destination for the 3000 sheets P that are the printing media for the job 2. 3000 sheets P in the job 2 are thus contained in the container unit 30.

(3) When the job 3 is executed, the number of containable sheets left for the container unit 20 is 5000, and the number of containable sheets left for the container unit 30 is 7000. The maximum value of the numbers of containable sheets left is thus 7000 for the container unit 30. The number of prints in the job 3 is 6000 and is within the range up to the maximum value "7000" of the numbers of containable sheets left. 6000 sheets P in the job 3 are thus contained in the container unit 30 having the maximum value "7000".

(4) When the job 4 is executed, the number of containable sheets left for the container unit 20 is 5000, and the number of containable sheets left for the container unit 30 is 1000. The maximum value of the numbers of containable sheets left is thus 5000 for the container unit 20. The number of prints in the job 4 is 5000 and is within the range up to the maximum value "5000" of the numbers of containable sheets left. 5000 sheets P in the job 4 are thus contained in the container unit 20 having the maximum value "5000".

(5) When the job 5 is executed, the number of containable sheets left for the container unit 20 is 0, and the number of containable sheets left for the container unit 30 is 1000. The maximum value of the numbers of containable sheets left is thus 1000 for the container unit 30. The number of prints in the job 5 is 3000 and exceeds the maximum value "1000" of the numbers of containable sheets left. The CPU 51 designates non-execution of printing in the job 5. An error is displayed on the display 55A, the printing and outputting is not performed.

If the maximum value of the acquired numbers of containable sheets left for the number of contained sets is higher than or equal to the number of prints in the print job to be executed subsequently in the print control apparatus 50 according to this exemplary embodiment, the printed printing media are discharged to one of the multiple container units 20 and 30 that has the maximum value of the numbers of containable sheets left (one of the container unit 20 and the container unit 30), and thereby division of the discharge destination for the printing media in the print job into the multiple container units is avoided.

Suppose a case where the control as described is not performed and where if a container unit as a discharge destination has the number of staying sheets exceeding the number of full sheets in a period from the discharging of the first sheet in the print job to a point midway in printing, that is, if the container unit becomes in a so-called stack full state, switching control to automatically perform switching to a different container unit is performed. In the case as described above, a printing process as described in FIGS. 6A and 6B.

Figure 6A:
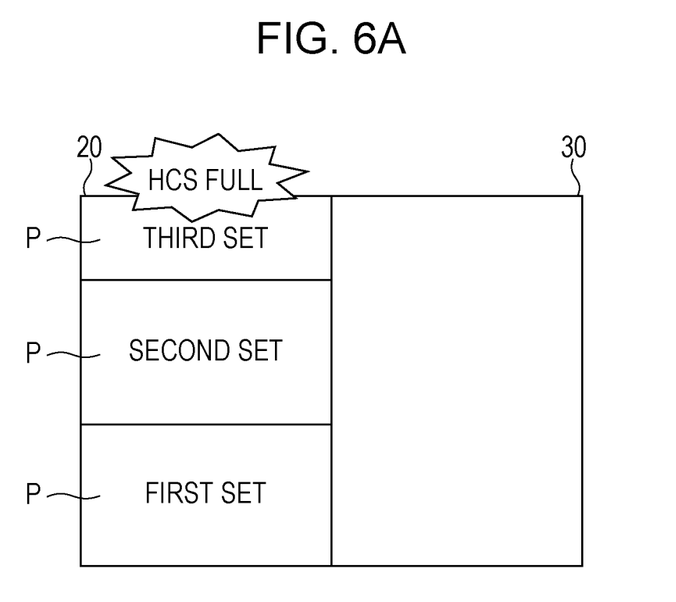
FIG. 6A illustrates the container units yet to undergo automatic switching.
Figure 6B:
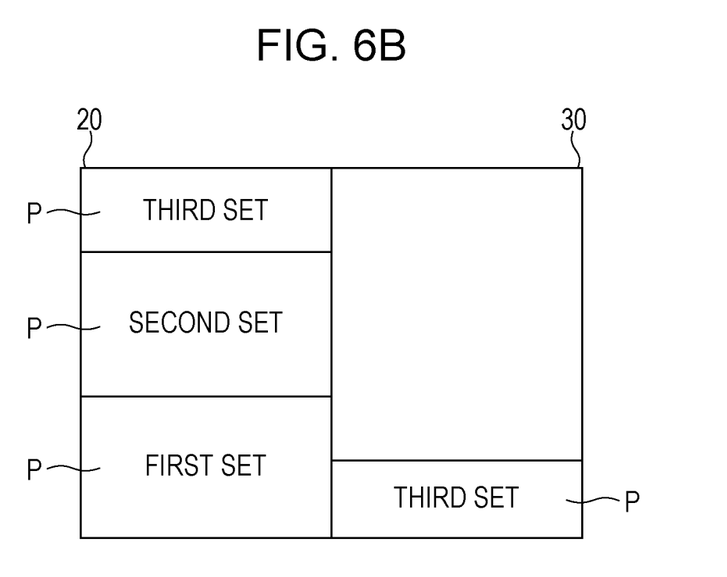
FIG. 6B illustrates the container units having undergone the automatic switching.

Specifically, as illustrated in FIGS. 6A and 6B, sheets P having undergone the printing process are discharged to, for example, the container unit 20 that is a predetermined discharge destination. For example, in a case where the first set and the second set are contained in the container unit 20 but the number of staying sheets in the container unit 20 reaches the number of full sheets in the course of discharging the third set, control to automatically perform switching of the discharge destination to the container unit 30 that is a different container unit is performed in the course of the discharging of the third set. In such a case, as illustrated in FIGS. 6A and 6B, the printing media (sheets P) as the third set in the print job are discharged separately to the multiple container units that are the container unit 20 and the container unit 30.

In contrast, in this exemplary embodiment, the printing media discharge control is performed. Division of the discharge destination into the multiple container units caused by the change of the discharge destination in the course of the print job is thereby avoided as illustrated in FIG. 5.

According to this exemplary embodiment, if the number of prints in a print job exceeds the maximum value of the numbers of containable sheets left for the multiple container units 20 and 30, that is, if the maximum value is lower than the number of prints in the print job to be executed subsequently, printing to be performed in accordance with the print job is not performed, and thereby printing media discharging performed separately to the multiple container units in one print job is reliably avoided.

According to this exemplary embodiment, if the non-printing control not to perform the printing is performed, a notification that the non-printing control has been performed is displayed on the display 55A, and thereby it is easier to verify that the non-printing control has been performed than in a case where only the non-printing control is performed.

In this exemplary embodiment, the number of prints in the print job to be executed subsequently is less than or equal to the maximum value of the numbers of containable sheets left, the control to report one of the multiple container units 20 and 30 that has the maximum value of the numbers of containable sheets left is further performed. The discharge destination for the printing media in the print job is recognized more easily than in the case where the reporting is not performed.

Specifically, as illustrated in FIG. 7, the reporting is performed by displaying a container unit (the container unit 20 (a stacker tray 1) or the container unit 30 (a stacker tray 2)) having the maximum value of the numbers of containable sheets left in the job history displayed on the display 55A.

In FIG. 7, the reporting is performed in such a manner that the container unit 20 as the discharge destination stacker tray 1 is displayed as the above-described container unit having the maximum value of the numbers of containable sheets left and the container unit 30 is displayed as the stacker tray 2.

In this exemplary embodiment, the maximum value of the numbers of containable sheets left is reported.

Specifically, as illustrated in FIG. 7, for example, the reporting is performed in such a manner that the container unit having the maximum value of the numbers of containable sheets left is displayed together with the job history displayed on the display 55A and the maximum value of the numbers of sheets is displayed as, for example, 7000 (the maximum value).

Accordingly, it is easier to recognize in advance whether the number of prints in the print job to be executed subsequently is less than or equal to the maximum value of the numbers of containable sheets left than in a case where reporting is not performed.

In this exemplary embodiment, as illustrated in FIG. 7, the reporting is performed in such a manner that the number of containable sheets left for one of the multiple container units 20 and 30 that has the maximum value of the numbers of containable sheets left is displayed on the display 55A. The number of containable sheets left for one of the multiple container units 20 and 30 that has the maximum value of the numbers of containable sheets left is thereby visually recognized by the display on the display 55A.

Second Exemplary Embodiment

A second exemplary embodiment will be described.

In the second exemplary embodiment, the CPU 51 further performs control to discharge a separation medium for separation between multiple print jobs to an appropriate one of the container units 20 and 30. The separation medium is interposed into multiple printing media discharged in accompany with printing in multiple print jobs.

A flowchart illustrating the flow of a printing process in this exemplary embodiment is almost the same as the flowchart described with reference to FIG. 4 of the first exemplary embodiment.

However, at the time of the job completion in step S114, a sheet serving as the separation medium for separation between the print jobs and having predetermined information regarding the print job printed thereon is discharged on the last discharged sheet P.

At this time, the CPU 51 further performs control to print, on the upper surface of the separation medium, the predetermined information identifying the content of the print job related to the printing medium discharged before the separation medium is discharged.

The predetermined information described above includes a date and time when the print job is executed, an identification (ID) of a person who executes the print job, the number of prints in the print job, and the like.

Specifically, examples of the predetermined information include a print on which "printing date and time: Aug. 30, 2019, 9:52 a.m., user ID: 69, job name: SamplePrint, discharge destination: stacker tray 1, the number of prints: 1000" are printed.

According to this exemplary embodiment, the separation of the multiple print jobs for each of the multiple container units is recognized more easily than in a case where the control to discharge the separation medium is not discharged.

In addition, the predetermined information identifying the content of the print job is printed on the upper surface of the separation medium, and thereby the content of the print job is recognized more easily than in a case where the predetermined information is not printed.

In this exemplary embodiment, a sheet formed from the same material as that of the sheet P used for the print job and having the same color is used as the sheet as the separation medium; however the sheet as the separation medium is not particularly limited to this.

Specifically, for example, a sheet in color different from that of the color of the printing medium used for the print job may be used as the sheet used as the separation medium.

As described above, the sheet as the separation medium has a different color as compared to a case where the sheet as the separation medium has the same color as that of the sheet as the printing medium used for the print job, and thereby separation between the multiple print jobs may be recognized easily.

Third Exemplary Embodiment

A third exemplary embodiment will be described.

Figure 8:
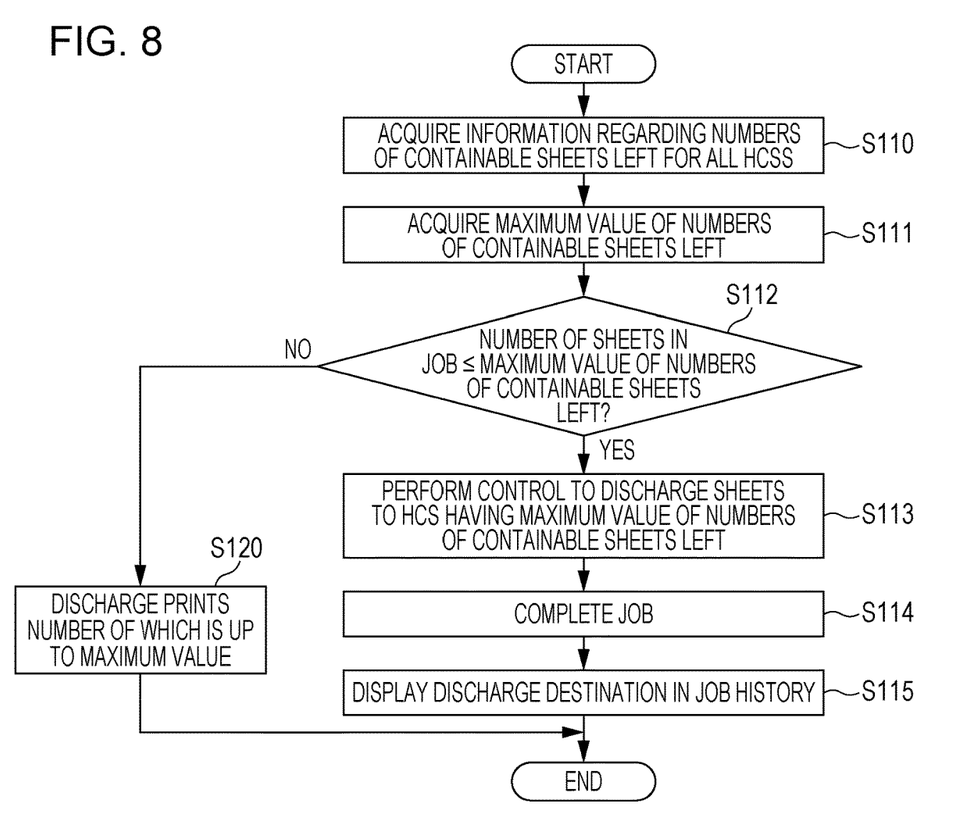
FIG. 8 is a flowchart illustrating the flow of a printing process executed by a print control apparatus according to a third exemplary embodiment.

FIG. 8 is a flowchart illustrating the flow of a printing process in the third exemplary embodiment. Note that the same components as those in the first exemplary embodiment are denoted by the same references, and description thereof is appropriately omitted.

In this exemplary embodiment, if the number of prints in a print job to be executed subsequently exceeds the maximum value of the numbers of containable sheets left, the CPU 51 further performs the capped printing control to discharge printed printing media the number of which is up to the maximum value to a container unit able to contain the printing media.

In this exemplary embodiment, step S116 in the flowchart in the first exemplary embodiment is changed to step S120. The other steps are the same as those in the first exemplary embodiment.

In this exemplary embodiment, if the number of prints in a print job to be executed subsequently exceeds the maximum value of the numbers of containable sheets left in step S112, the processing proceeds to step S120.

In step S120, the capped printing control is performed. The capped printing control is a process in which prints the number of which is up to the maximum value of the numbers of containable sheets left are discharged to the container unit having the maximum value.

In the capped printing control, if the maximum value of the numbers of containable sheets left is lower than the number of prints in the print job to be executed subsequently, the printed printing media the number of which is up to the maximum value are discharged to a container unit of the multiple container units that has the maximum value of the numbers of containable sheets left. According to this exemplary embodiment, as compared to a case where the capped printing control is not performed, discharging the printing media in the print job separately to a container unit other than the container unit having the maximum value is avoided, the discharging of the printed printing media the number of which is up to the maximum value is performed, and thus the work efficiency may be enhanced.

Fourth Exemplary Embodiment

A fourth exemplary embodiment will be described.

Figure 9:
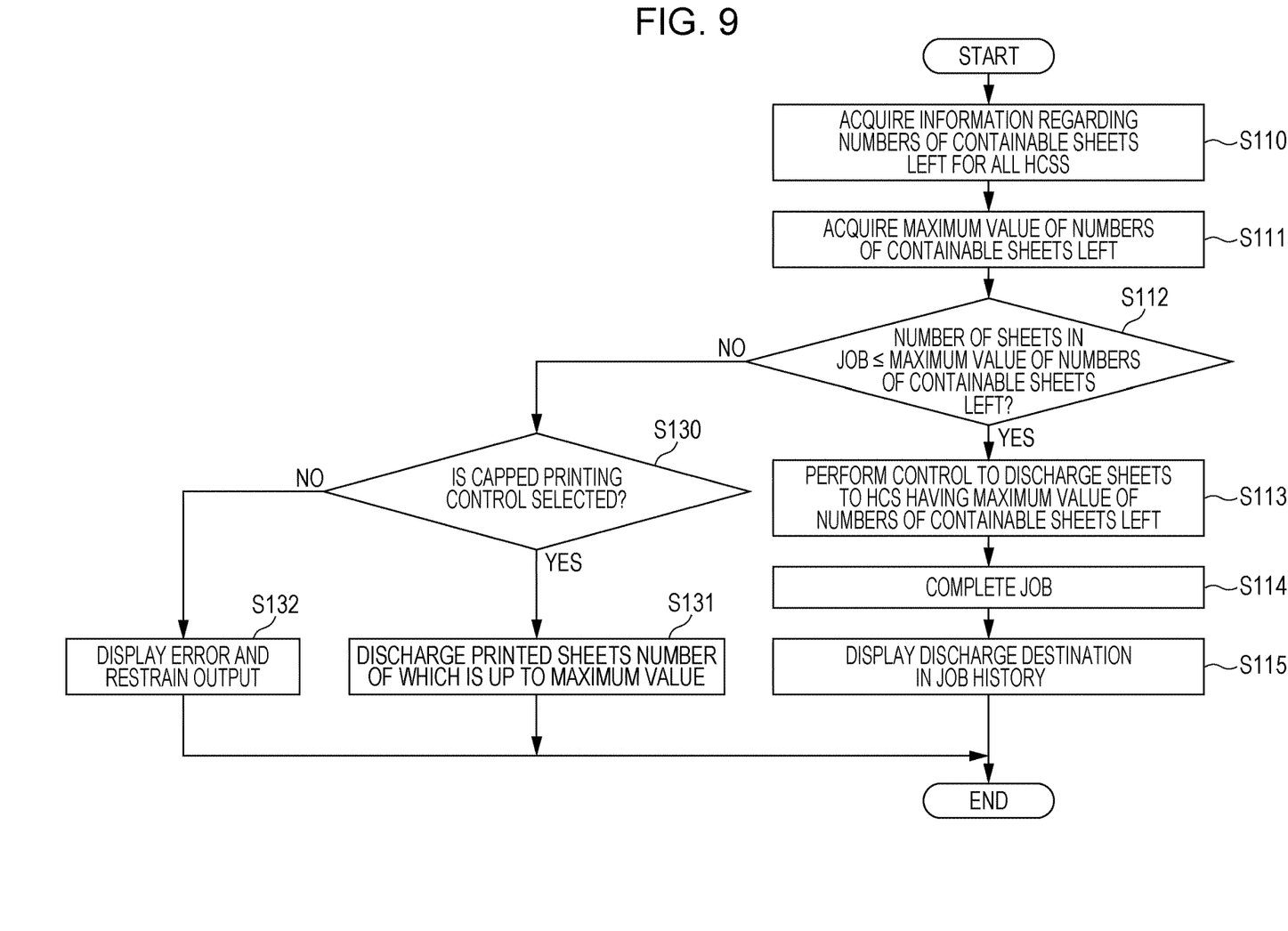
FIG. 9 is a flowchart illustrating the flow of a printing process executed by a print control apparatus according to a fourth exemplary embodiment.

FIG. 9 is a flowchart illustrating the flow of a printing process in the fourth exemplary embodiment. Note that the same components as those in the first exemplary embodiment are denoted by the same references, and description thereof is appropriately omitted.

In the fourth exemplary embodiment, if the number of prints in the print job to be executed subsequently exceeds the maximum value of the numbers of containable sheets left, the user selects one of the non-printing control not to perform the printing in the print job and the capped printing control as described above, and the CPU 51 performs the selected control.

When a print job to be executed subsequently is started, buttons are displayed on the screen of the liquid crystal display device of the display 55A but are not particularly illustrated. In addition, if the number of prints in the print job to be executed subsequently exceeds the maximum value of the numbers of containable sheets left, that is, if the maximum value of the numbers of containable sheets left is lower than the number of prints in the print job to be executed subsequently, display for selecting one of the non-printing control not to perform the printing in the print job and the capped printing control to perform the printing up to the maximum value as described above is performed, and a notification for pressing the button for the selected control is displayed. Pressing one of the buttons with a finger enables the selected one to be determined.

Note that the display described above is designed to appear at the beginning but may be displayed only when the number of prints in the print job exceeds the maximum value of the numbers of containable sheets left.

Figure 4:
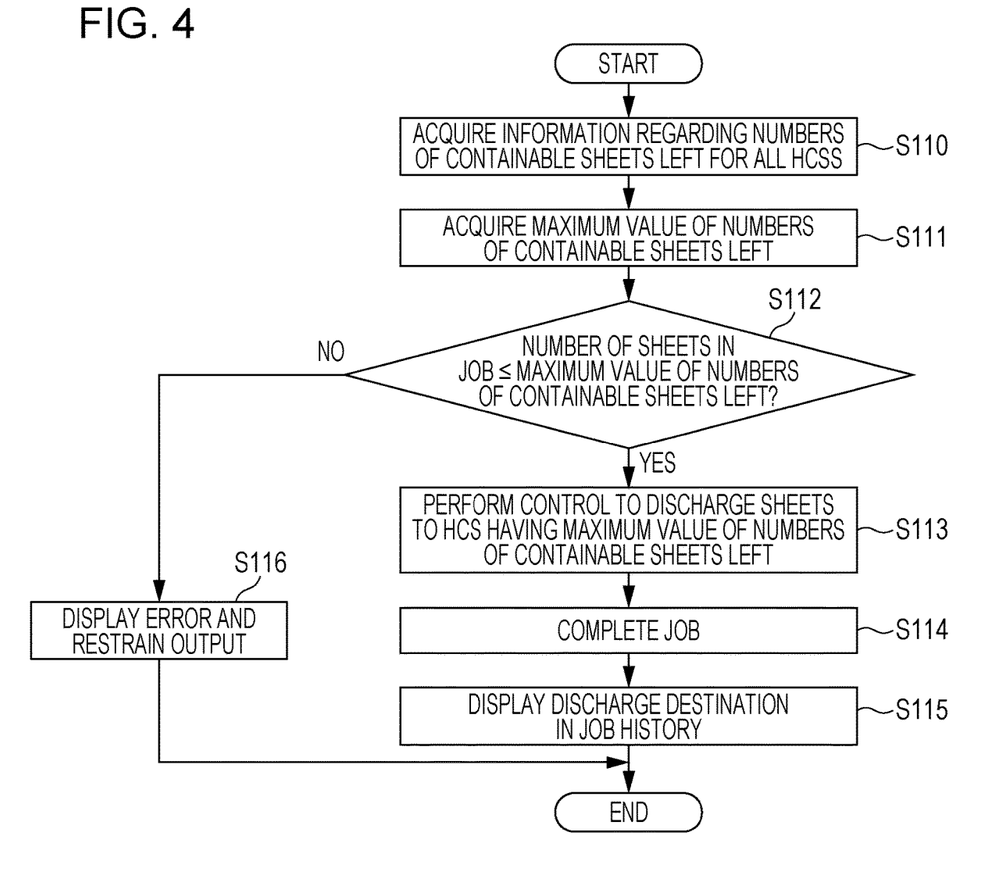
FIG. 4 is a flowchart illustrating the flow of a printing process executed by the print control apparatus according to the first exemplary embodiment.

In this exemplary embodiment, as illustrated in FIG. 9, step S116 in the flowchart in the first exemplary embodiment described with reference to FIG. 4 is changed to steps S130 to S132. The other steps are the same as those in the first exemplary embodiment.

In this exemplary embodiment, if the number of prints in the print job to be executed subsequently exceeds the maximum value of the numbers of containable sheets left in step S112, the processing proceeds to step S130.

In step S130, the CPU 51 determines whether the capped printing control is selected. If the CPU 51 determines that the capped printing control is selected (step S130: YES), the processing proceeds to step S131. If the CPU 51 determines that the capped printing control is not selected (step S130: NO), the processing proceeds to step S132.

In step S131, the CPU 51 discharges the printed sheets P the number of which is up to the maximum value to a container unit having the maximum value of the numbers of containable sheets left.

In step S132, the CPU 51 displays an error on the display 55A, and the sheets P are restrained from being output, that is, the printing in the print job is not performed.

The printing process is then terminated.

According to this exemplary embodiment, as compared to a case where the user does not select one of the non-printing control and the capped printing control that are described above, convenience to the user may be enhanced.

The present disclosure is not limited to the exemplary embodiments described above, and various modifications, changes, and improvements may be made without departing from the spirit of the disclosure. For example, any of the exemplary embodiments described above may appropriately be combined.

For these exemplary embodiments, a mode of implementing the processes by software has heretofore been described as an example; however, processes equivalent to the respective processes in the flowcharts may be implemented on, for example, an application specific integrated circuit (ASIC) and may thereby be executed by hardware. In this case, each process is speeded up as compared to the case where the process is implemented by the software.

In each exemplary embodiment described above, the mode in which the printing program is installed on the ROM has been described; however, the exemplary embodiment is not limited to this. The printing program according to the present disclosure may also be provided in such a manner as to be recorded in a computer-readable storage medium. For example, the printing program according to the present disclosure may be provided in such a manner as to be recorded in an optical disk such as a compact disc (CD)-ROM or a digital versatile disc (DVD)-ROM. The printing program according to the present disclosure may also be provided in such a manner as to be recorded in a semiconductor memory such as a universal serial bus (USB) memory or a flash memory. Further, the print processing apparatus 10 may acquire the program via a communication network from an external apparatus connected to the communication network.

In the embodiments above, the term "processor" refers to hardware in a broad sense. Examples of the processor include general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A print control apparatus comprising:
   a processor configured to
      receive printing information including a number of prints to be printed in accordance with one of a plurality of print jobs,
      acquire numbers of containable sheets left for a plurality of respective container units that contain printing media printed in accordance with the plurality of print jobs,
      control to discharge one of the printing media that is printed in accordance with the print job to a container unit of the plurality of container units that has a maximum value of the numbers of containable sheets left that is higher than or equal to the number of prints in one of the plurality of print jobs that is to be executed subsequently, and
      cap printing so that a total discharge amount of the printed printing media for the one of the plurality of print jobs is up to the maximum value of the numbers of containable sheets left and is to the container unit of the plurality of container units that has the maximum value of the numbers of containable sheets left, if the maximum value of the numbers of containable sheets left is lower than the number of prints in the one of the plurality of print jobs to be executed subsequently.

2. The print control apparatus according to claim 1, wherein the processor is configured not to perform printing of the one of the plurality of print jobs to be executed subsequently if the maximum value is lower than the number of prints in the one of the plurality of print jobs to be executed subsequently.

3. The print control apparatus according to claim 2, wherein the processor is configured to present a notification that non-printing has occurred.

4. The print control apparatus according to claim 1, wherein the processor is configured to report the container unit of the plurality of container units that has the maximum value of the numbers of containable sheets left if the maximum value is higher than or equal to the number of prints in the one of the plurality of print jobs to be executed subsequently.

5. The print control apparatus according to claim 2, wherein the processor is configured to report the container unit of the plurality of container units that has the maximum value of the numbers of containable sheets left if the maximum value is higher than or equal to the number of prints in the one of the plurality of print jobs to be executed subsequently.

6. The print control apparatus according to claim 3, wherein the processor is configured to report the container unit of the plurality of container units that has the maximum value of the numbers of containable sheets left if the maximum value is higher than or equal to the number of prints in the one of the plurality of print jobs to be executed subsequently.

7. The print control apparatus according to claim 4, wherein the processor is configured to report the maximum value.

8. The print control apparatus according to claim 5, wherein the processor is configured to report the maximum value.

9. The print control apparatus according to claim 6, wherein the processor is configured to report the maximum value.

10. The print control apparatus according to claim 7, wherein the processor is configured to report the number of containable sheets left for the container unit of the plurality of container units that has the maximum value of the numbers of containable sheets left by controlling a display.

11. The print control apparatus according to claim 1, wherein the processor is configured to control discharge of a separation medium for separation between the plurality of print jobs to an appropriate one of the container units, the separation medium being interposed between a plurality of printing media discharged with printing in the plurality of print jobs.

12. The print control apparatus according to claim 2, wherein the processor is configured to control discharge of a separation medium for separation between the plurality of print jobs to an appropriate one of the container units, the separation medium being interposed between a plurality of printing media discharged with printing in the plurality of print jobs.

13. The print control apparatus according to claim 3, wherein the processor is configured to control discharge of a separation medium for separation between the plurality of print jobs to an appropriate one of the container units, the separation medium being interposed between a plurality of printing media discharged with printing in the plurality of print jobs.

14. The print control apparatus according to claim 4, wherein the processor is configured to control discharge of a separation medium for separation between the plurality of print jobs to an appropriate one of the container units, the separation medium being interposed between a plurality of printing media discharged with printing in the plurality of print jobs.

15. The print control apparatus according to claim 7, wherein the processor is configured to control discharge of a separation medium for separation between the plurality of print jobs to an appropriate one of the container units, the separation medium being interposed between a plurality of printing media discharged with printing in the plurality of print jobs.

16. The print control apparatus according to claim 11, wherein the processor is configured to control printing information on an upper surface of the separation medium, the information identifying content of a print job related to one of the printing media that is discharged before the separation medium is discharged.

17. The print control apparatus according to claim 16, wherein the separation medium has a different color from colors of the plurality of printing media.

18. The print control apparatus according to claim 1, wherein the processor is configured to allow a user to select one of non-printing and the cap printing if the maximum value of the numbers of containable sheets left is lower than the number of prints in the print job to be executed subsequently.

19. A non-transitory computer readable medium storing a program causing a computer to execute a process for printing, the process comprising:
    receiving printing information including a number of prints to be printed in accordance with one of a plurality of print jobs,
    acquiring numbers of containable sheets left for a plurality of respective container units that contain printing media printed in accordance with the plurality of print jobs, and
    discharging one of the printing media that is printed in accordance with the print job to a container unit of the plurality of container units that has a maximum value of the numbers of containable sheets left that is higher than or equal to the number of prints in one of the plurality of print jobs that is to be executed subsequently, and
    capping printing so that a total discharge amount of the printed printing media for the one of the plurality of print jobs is up to the maximum value of the numbers of containable sheets left and is to the container unit of the plurality of container units that has the maximum value of the numbers of containable sheets left, if the maximum value of the numbers of containable sheets left is lower than the number of prints in the one of the plurality of print jobs to be executed subsequently.

* * * * *